(12) United States Patent
Taniuchi et al.

(10) Patent No.: US 6,264,487 B1
(45) Date of Patent: Jul. 24, 2001

(54) ROTARY CONNECTOR

(75) Inventors: Ryoichi Taniuchi, Tsuruga; Toshio Ozawa, Ikoma, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/487,252

(22) Filed: Jan. 19, 2000

(30) Foreign Application Priority Data

Jan. 20, 1999 (JP) .................................................. 11-011802

(51) Int. Cl.[7] .................................................. H01R 35/04
(52) U.S. Cl. .................................................. 439/164; 439/15
(58) Field of Search .................................... 439/164, 15

(56) References Cited

U.S. PATENT DOCUMENTS

| 5,046,951 | 9/1991 | Suzuki | 439/15 |
|---|---|---|---|
| 5,219,460 | 6/1993 | Kato et al. | 439/164 |
| 5,224,871 | 7/1993 | Ida et al. | 439/164 |
| 5,314,344 | 5/1994 | Ida et al. | 439/164 |
| 5,669,777 | 9/1997 | Matsumoto et al. | 439/164 |
| 5,865,634 | 2/1999 | Best | 439/164 |
| 5,890,921 | * 4/1999 | Kuroda et al. | 439/164 |
| 5,980,286 | * 4/1999 | Best et al. | 439/164 |

FOREIGN PATENT DOCUMENTS

| 4419077 A1 | 12/1994 | (DE) . |
|---|---|---|
| 4422788 A1 | 1/1995 | (DE) . |
| 0770521 A1 | 5/1997 | (EP) . |
| 4-310445 | 11/1992 | (JP) . |

* cited by examiner

*Primary Examiner*—Gary F. Paumen
(74) *Attorney, Agent, or Firm*—Wenderoth, Lind & Ponack, L.L.P.

(57) ABSTRACT

A rotary connector, in which a guide ring is disposed in an annular space in such a manner that the guide ring elastically contacts with the lower side of the cover portion of an inner case, and the intermediate supporting portion of each of a plurality of cylindrical rollers is rotatably supported by the guide ring in the state that the rotation axis of each roller slants, also both end-sides of each roller contact with a flat cable, also the circumference-side of each roller contacts with the upper side of a lower-side-cover. The above structure realizes a highly reliable low cost rotary connector in which a noise caused by the each-other's bumps of the component parts of the rotary connector is suppressed and the stress applied to the flat cable is greatly decreased.

13 Claims, 13 Drawing Sheets

ROTARY CONNECTOR

FIELD OF THE INVENTION

The present invention relates to a rotary connector used for a steering device for a motor vehicle or the like. More particularly, the invention relates to a rotary connector whose outer case and inner case which is rotatable relatively to the outer case are electrically connected by using a flexible flat cable.

BACKGROUND OF THE INVENTION

In general, in a conventional rotary connector, a flexible flat cable shares high percentage of the total cost of the rotary connector. A proposal disclosed in the Japanese Non-Examined Patent Publication H4-310445 is an example for saving the cost by decreasing the length of the flexible flat cable.

Hereinafter the conventional rotary connector is described referring to FIG. 14 through FIG. 16.

FIG. 14 is a cross sectional plan view showing the conventional rotary connector, FIG. 15 is a cross sectional side view showing the main portion of the same, and FIG. 16 is an exploded view showing the conventional rotary connector.

As shown in the illustrations, at the inner side of an annular outer case 510, an inner case 520 is disposed in such a manner as to be rotatable relatively to the outer case 510. The inner case 520 comprises a cylindrical portion 522 and a cover portion 521 which covers the upper side of an annular space 540 formed with the inner wall 511 of the annular outer case 510 and the outer wall of the cylindrical portion 522 of the inner case 520. A lower-side-cover 530 is fixed to the lower side of the annular outer case 510, and covers the lower side of the annular space 540.

In the annular space 540, a flexible flat cable 550 is disposed. The respective ends (551,552) of the cable 550 are respectively fixed to the outer case 510 and to the inner case 520, by which the outer case 510 and the inner case 520 are electrically connected as well. The outer case 510 and the inner case 520 are respectively further electrically connected to outer electrical circuits. In the annular space 540, the cable 550 is wound along the inner wall 511 of the outer case 510 in a first direction, and along the outer wall of the cylindrical portion 552 of the inner case 520 in a second direction which is opposite to the first direction via a U-shaped reversed-portion 553.

In the annular space 540, a plurality of rollers 570, which are connected by a connecting member 560 along the annular space 540, are disposed. The rollers 570 respectively rotate, and, guide and regulate the cable 550 wound along the annular space 540. Rollers 571 and 572 disposed at the respective end portions (i.e. cut-portion 561) of the connecting member 560 guide the cable 550 which passes through the cut-portion 561 to be reversed along the rollers 571 and 572.

In the above structure, when the inner case 520 is counterclockwise rotated, the cable 550 is wound off from the side of the cylindrical portion 522 of the inner case 520, and the reversed-portion 553 of the cable 550 presses the roller 571, whereby the connecting member 560 is counterclockwise rotated and the cable 550 becomes the state of wound-off (i.e., the dimension of the cable 550 becomes longer than before at the side of the inner wall 511 of the outer case 510).

On the other hand, when the inner case 520 is clockwise rotated, the cable 550 is wound up toward the side of the cylindrical portion 522 of the inner case 520 and presses the roller 572, whereby the connecting member 560 is rotated clockwise and the cable 550 becomes the state of wound-up (i.e., the dimension of the cable 550 becomes longer than before at the side of the cylindrical portion 522 of the inner case 520).

However, in the above conventional structure, predetermined clearances are formed between the rollers (570,571, 572) and the outer case 510, and, between the rollers and the inner case 520, also between the connecting member 560 and the outer case 510, also between the connecting member 560 and the inner case 520, for enabling the winding of the cable 550 and for enabling the rotation of the rollers. Also the mass of the rollers are large. Therefore, when a vibration is applied to the rotary connector during driving a motor vehicle for instance, an audible noise caused by the each-other's bumps of the component parts of the rotary connector occurs.

Also, when the inner case 520 is rotated, the connecting member 560 is moved along the rotating direction of the inner case 520 in the annular space 540. In this case, the reversed-portion 553 of the cable 550 presses the roller (571,572), which causes the damage of the cable 550 due to the stress applied to the flat cable 550.

SUMMARY OF THE INVENTION

The present invention addresses the problems in the conventional rotary connector and aims to provide a highly reliable low cost rotary connector, in which a noise caused by the each-other's bumps of the component parts (i.e., rollers, cases and the like) of a rotary connector is suppressed and stress applied to a flat cable is greatly decreased.

For realizing the above aim, the rotary connector of the present invention comprises:

(a) an annular outer case, (b) an inner case disposed at the inner side of the annular outer case, wherein the inner case comprises a cylindrical portion and a cover portion which covers the upper side of the annular space formed with the outer annular case and the cylindrical portion of the inner case, (c) a lower-side-cover which is fixed to the outer annular case and covers the lower side of the annular space, (d) a flexible flat cable which is disposed in the annular space in such a manner as to be wound along the inner wall of the outer annular case in a first direction, and along the outer wall of the cylindrical portion of the inner case in a second direction which is opposite to the first direction via the reversed-portion of the cable, (e) a guide ring which has a cut-portion where the reversed-portion of the cable passes through, wherein the guide ring is disposed in the annular space in such a manner as to be rotated along the annular space in the state that the guide ring elastically contacts with the lower side of the cover portion of the inner case, and (f) a plurality of cylindrical rollers, wherein the intermediate supporting portion of each of the rollers is rotatably supported by the guide ring in the state that the rotation axis of each roller slants, and the lower portion of the outer end-side and the upper portion of the inner end-side of each roller respectively contact with the cable, also the circumference-side of each roller elastically contacts with the upper side of the lower-side-cover.

The above structure realizes a highly reliable low cost rotary connector in which a noise caused by the each-other's bumps of the components parts of the rotary connector is suppressed and stress applied to the cable is greatly decreased.

DETAILED DESCRIPTION OF THE INVENTION

Hereinafter exemplary embodiments of the present invention is described referring to illustrations.

First Exemplary Embodiment

Figure 1:
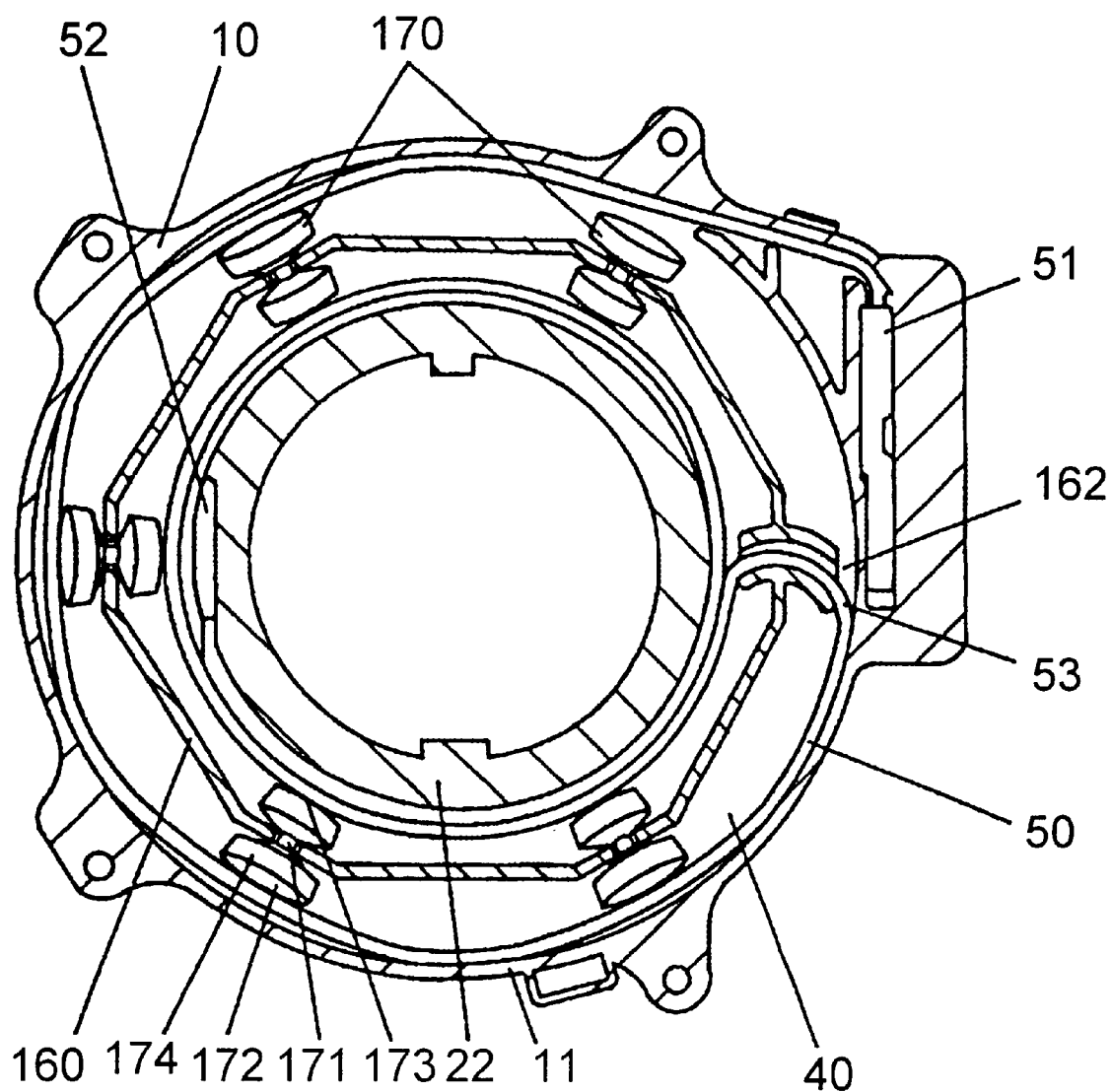
FIG. 1 is a cross sectional plan view showing a rotary connector in a first exemplary embodiment of the present invention.
Figure 2:
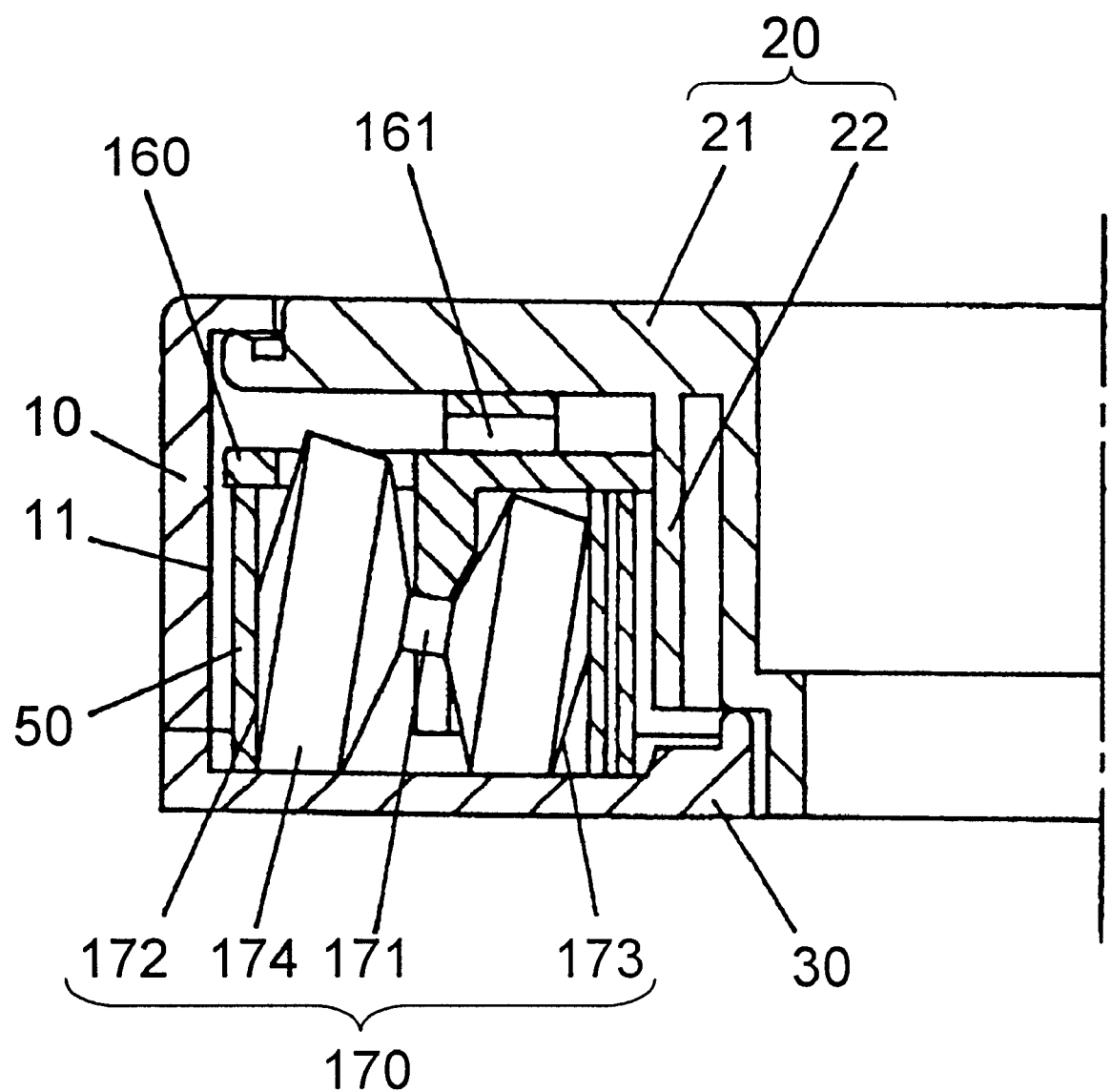
FIG. 2 is a cross sectional side view showing the main portion of the rotary connector in the same.
Figure 3:
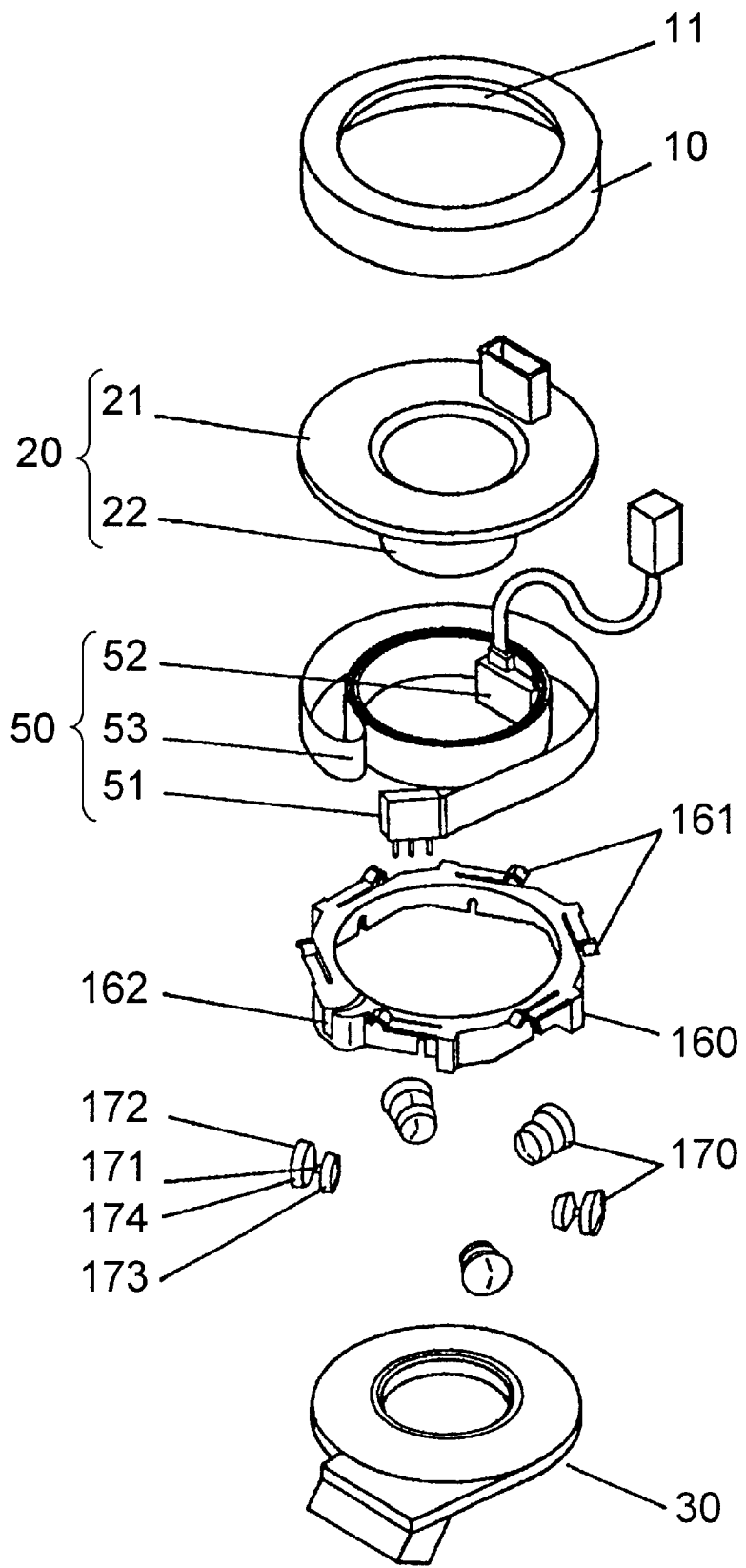
FIG. 3 is an exploded view showing the rotary connector in the same.

FIG. 1 is a cross sectional plan view showing a rotary connector in the first exemplary embodiment of the present invention, FIG. 2 is a cross sectional side view showing the main portion of the rotary connector in the same, and FIG. 3 is an exploded view showing the rotary connector in the same.

As shown in the illustrations, at the inner side of an annular outer case 10, an inner case 20 is disposed in such a manner as to be rotatable relatively to the outer case 10. The inner case 20 comprises a cylindrical portion 22 and a cover portion 21 which covers the upper side of an annular space 40 formed with the inner wall 11 of the annular outer case 10 and the outer wall of the cylindrical portion 22 of the inner case 20. A lower-side-cover 30 is fixed to the lower side of the annular outer case 10 and covers the lower side of the annular space 40.

In the annular space 40, a flexible flat cable 50 is disposed. The respective ends (51,52) of the cable 50 are respectively fixed to the outer case 10 and to the inner case 20, by which the outer case 10 and the inner case are electrically connected as well. The outer case 10 and the inner case 20 are respectively further electrically connected to outer electrical circuits. The cable 50, which is disposed in the annular space 40, is wound along the inner wall 11 of the outer case 10 in a first direction, and along the outer wall of the cylindrical portion 22 of the inner case 20 in a second direction which is opposite to the first direction via a U-shaped reversed-portion 53 of the cable 50.

The structure described in the above is same as in the conventional rotary connector. The details of the difference from the conventional structure are described hereinafter.

In this exemplary embodiment of the present invention, a resinous guide ring 160 is disposed in the annular space 40 in such a manner that a plurality of hinge-shaped slightly-upward-bent elastic portions 161, which are unitarily formed with the guide ring 160 on the upper side thereof, contact with the lower side of the cover portion 21 of the inner case 20. The guide ring 160 has a cut-portion 162 where the reversed-portion 53 of the cable 50 passes through.

Also a plurality of cylindrical rollers 170 are disposed in the annular space 40 in such a manner that the constricted intermediate supporting portion 171 of each of the rollers 170 is rotatably supported by the guide ring 160 in the state that the rotation axis of the roller 170 slants.

The diameter of each roller 170 is formed in such a manner that the diameter of the outer portion (i.e., the portion positioned at the side of the inner wall 11 of the outer case 10) thereof is larger than the diameter of the inner portion (i.e., the portion positioned at the side of the outer wall of the cylindrical portion 22 of the inner case 20) thereof The circumference-side 174 of each roller 170 is elastically contacted with the upper side of the lower-side-cover 30 by the elastic pressing force of the elastic portions 161.

The lower half portion of the substantially conical outer end-side (i.e., the end-side positioned at the side of the inner wall 11 of the outer case 10) 172 of each roller 170, and the upper half portion of the substantially conical inner end-side (i.e., the end-side positioned at the side of the outer wall of the cylindrical portion 22 of the inner case 20) 173 of the roller 170 respectively contact with the cable 50.

In the above structure, when the inner case 20 is counterclockwise rotated, the cable 50 is wound off from the side of the cylindrical portion 22 of the inner case 20, and the guide ring 160 whose elastic portions 161 elastically contact with the lower side of the cover portion 21 of the inner case 20 rotates counterclockwise, whereby each roller 170, whose supporting portion 171 is rotatably supported by the guide ring 160 and circumference-side 174 elastically contacts with the upper side of the lower-side-cover 30, is rolled in the state that the rotation axis of each roller 170 slants.

In this case, the lower half portion of the substantially conical outer end-side 172 of each roller 170 and the upper half portion of the substantially conical inner end-side 173 of the roller 170 respectively contact with the cable 50, whereby clockwise winding force is applied to the cable 50 by the outer end-side 172 of the roller 170, and counterclockwise winding force is applied to the cable 50 by the inner end-side 173 of the roller 170, thus the cable 50 becomes the state of wound-off (i.e., the dimension of the cable 50 becomes longer than before at the side of the inner wall 11 of the outer case 10).

On the other hand, when the inner case 20 is clockwise rotated, the flat cable 50 is wound up toward the side of the cylindrical portion 22 of the inner case 20, and the guide ring 160 rotates clockwise, whereby counterclockwise winding force is applied to the cable 50 by the lower half portion of the outer end-side 172 of each roller 170, and clockwise winding force is applied to the cable 50 by the upper half portion of the inner end-side 173 of the roller 170, thus the cable 50 becomes the state of wound-up (i.e., the dimension of the cable 50 becomes longer than before at the side of the cylindrical portion 22 of the inner case 20).

In the above structure, the guide ring 160 elastically contacts with the lower side of the cover portion 21, and the circumference-side 174 of each roller 170 elastically contacts with the upper side of the lower-side-cover 30, therefore there is no gap in the vertical disposition of the component parts (i.e., rollers 170, guide ring 160, inner case 20 and lower-side-cover 30), whereby a noise caused by the each-other's bumps of the component parts is suppressed.

Also, the intermediate supporting portion 171 of each roller 170 is rotatably supported by the guide ring 160 in the state that the rotation axis of each roller 170 slants, and, the lower half portion of the outer end-side 172 of each roller 170 which rolls along the rotating direction of the guide ring 160 and the upper half portion of the inner end-side 173 of the roller 170 respectively contact with the cable 50, whereby the winding of the cable 50 is performed by the respective end-sides (172,173) smoothly and the stress applied to the cable 50 is greatly decreased, thus a highly reliable rotary connector is obtained with low cost.

Also, in each roller 170, the diameter of the portion whose circumferenceside 174 contacts with the upper side of the lower-side-cover 30 is formed to be larger than the diameter of the intermediate supporting portion 171, whereby each roller 170 can be rolled with smaller rotating force of the inner case 20, whereby the guide ring 160 can be smoothly rotated.

Also, in each roller 170, the diameter of the outer portion is formed to be larger than the diameter of the inner portion, whereby even in a large rotary connector, in which long rollers 170 are used due to long dimension between the outer wall of the cylindrical portion 22 of the inner case 20 and the inner wall 11 of the outer case 10, the winding of the cable 50 can be smoothly performed without causing imbalance between the dimension of the cable 50 wound by the outer end-side 172 and the dimension of the cable 50 wound by the inner end-side 173 though the number of rotations of each roller 170 is same in both end-sides (172,173), whereby smooth rotation of the guide ring 160 can be realized.

Furthermore, in each roller 170, the end-sides (172,173) are respectively shaped into substantially circular cones and the lower half portion of the outer end-side 172 and the upper half portion of the inner end-side 173 respectively contact with the cable 50, thus the contact area between the end-sides (172,173) and the cable 50 becomes large. As a result, the winding of the cable 50 is surely performed by each roller 170.

In the above, the end-sides (172,173) of each roller 170 are respectively shaped into substantially circular cones. However, the same effect can be obtained by respectively shaping the end-sides (172,173) into spherical cones because the cable 50 is flexible.

Second Exemplary Embodiment

Figure 4:
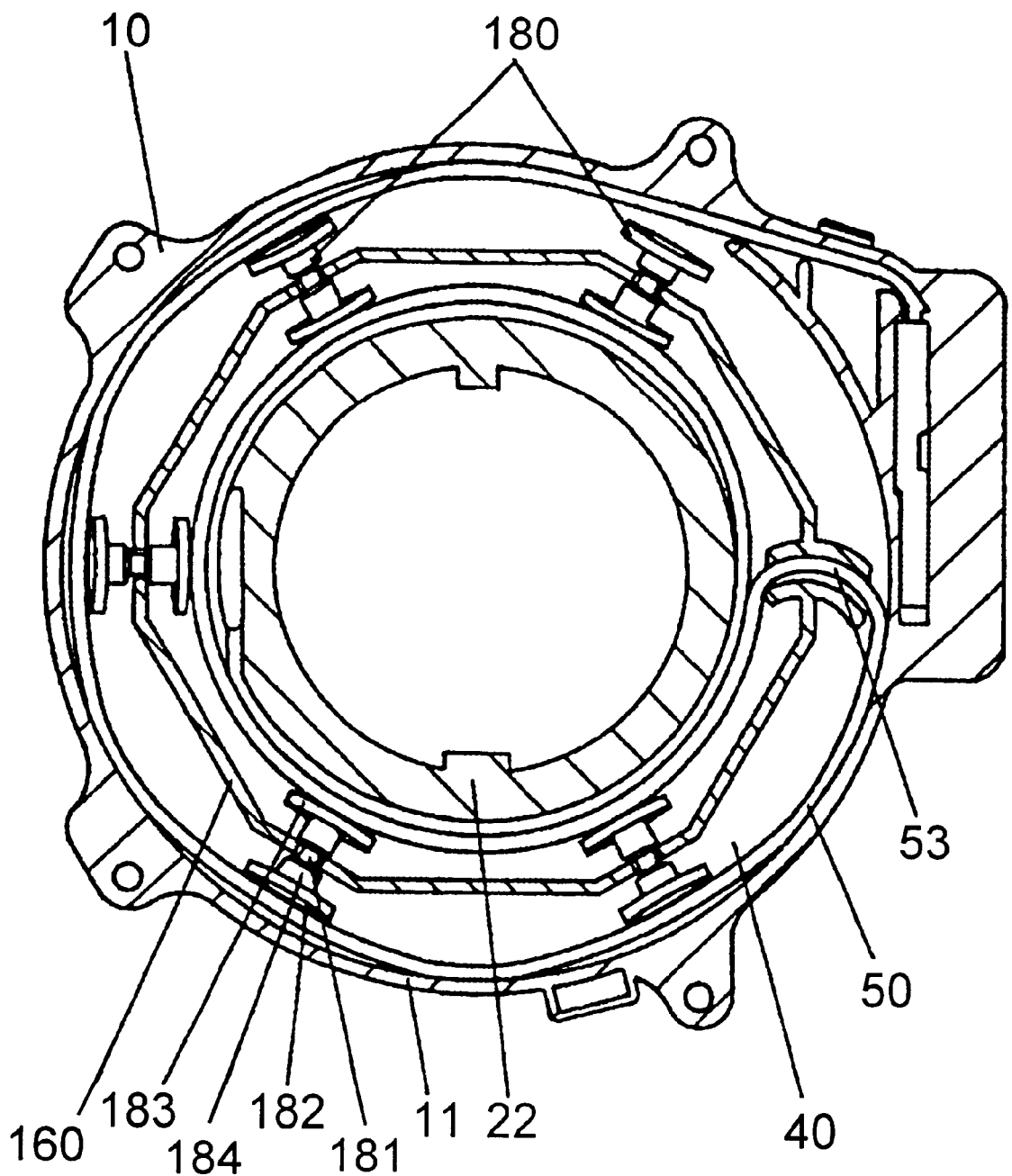
FIG. 4 is a cross sectional plan view showing a rotary connector in a second exemplary embodiment of the present invention.
Figure 5:
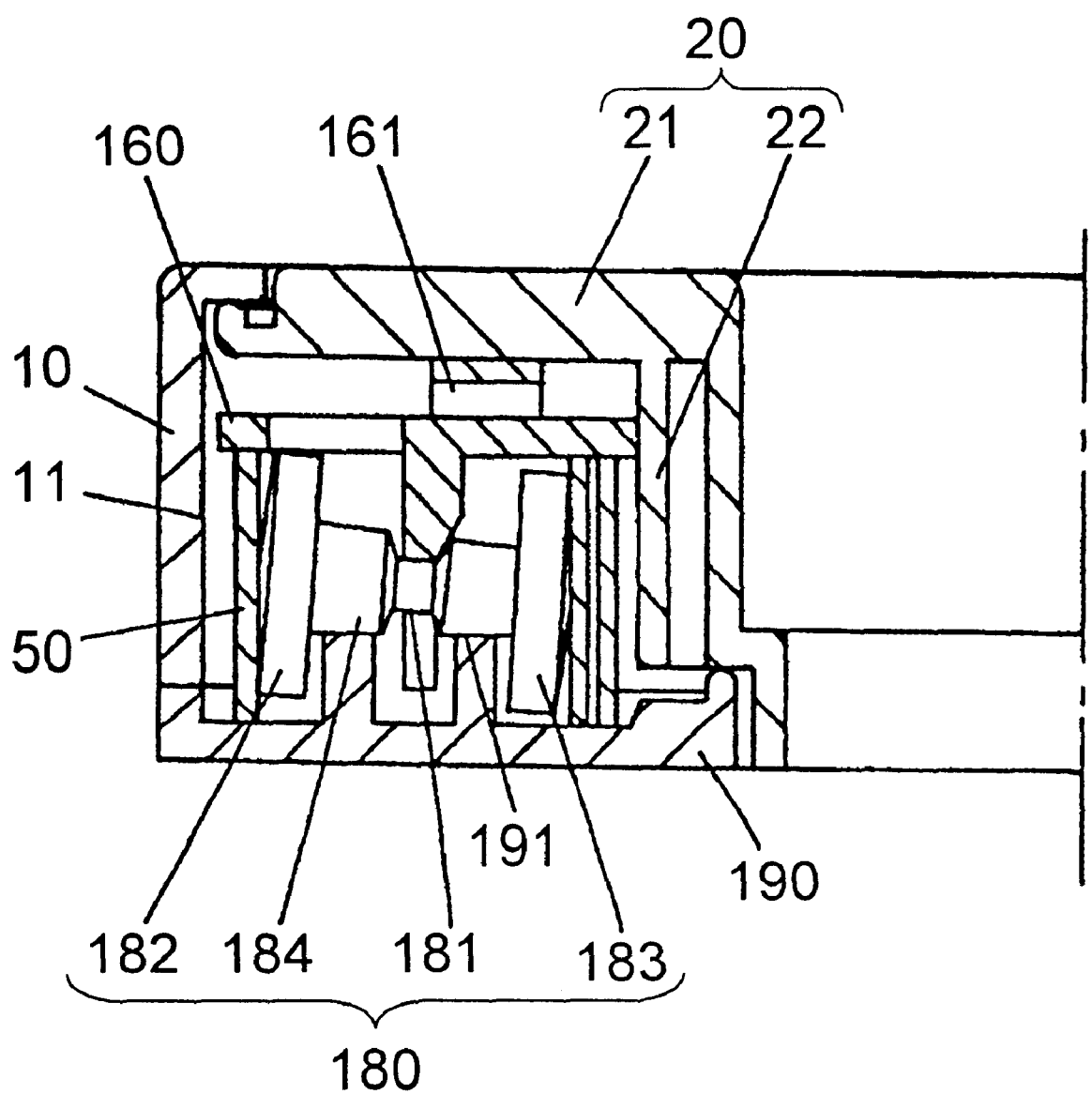
FIG. 5 is a cross sectional side view showing the main portion of the rotary connector in the same.
Figure 6:
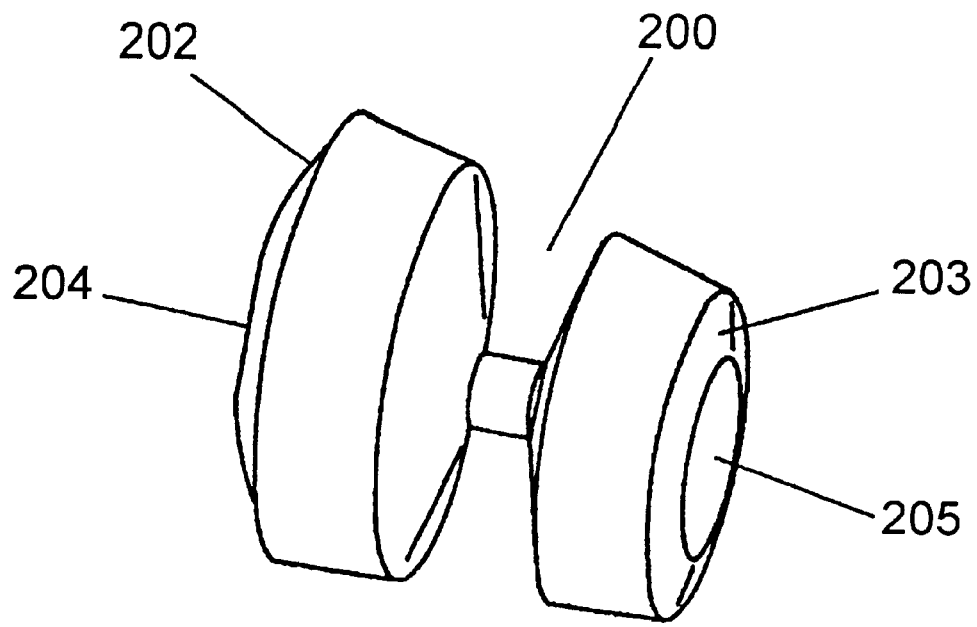
FIG. 6 is a perspective view showing a roller of the rotary connector in the same.
Figure 7:
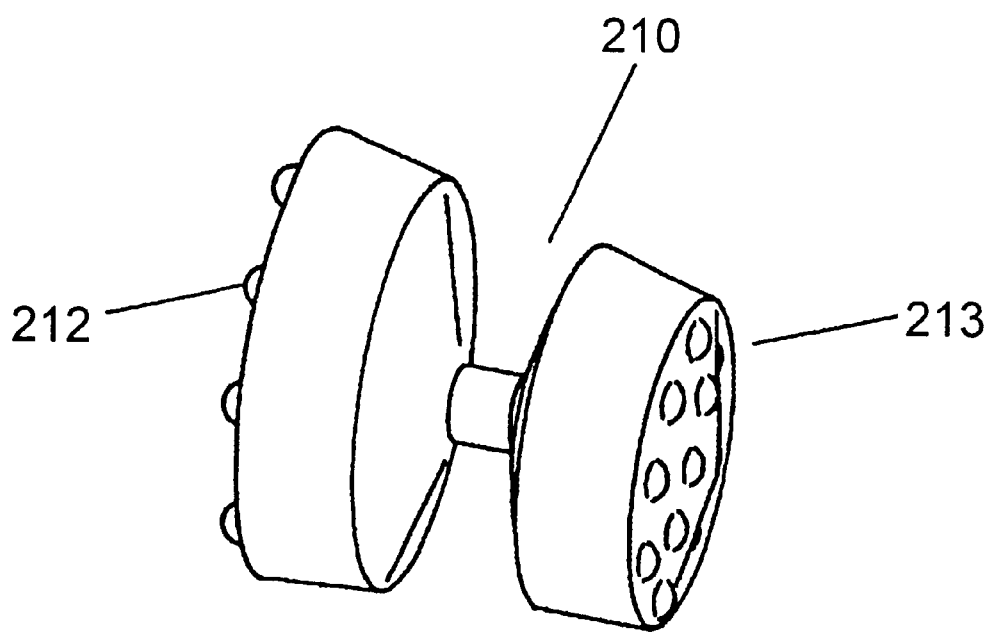
FIG. 7 is a perspective view showing another roller of the rotary connector in the same.
Figure 8:
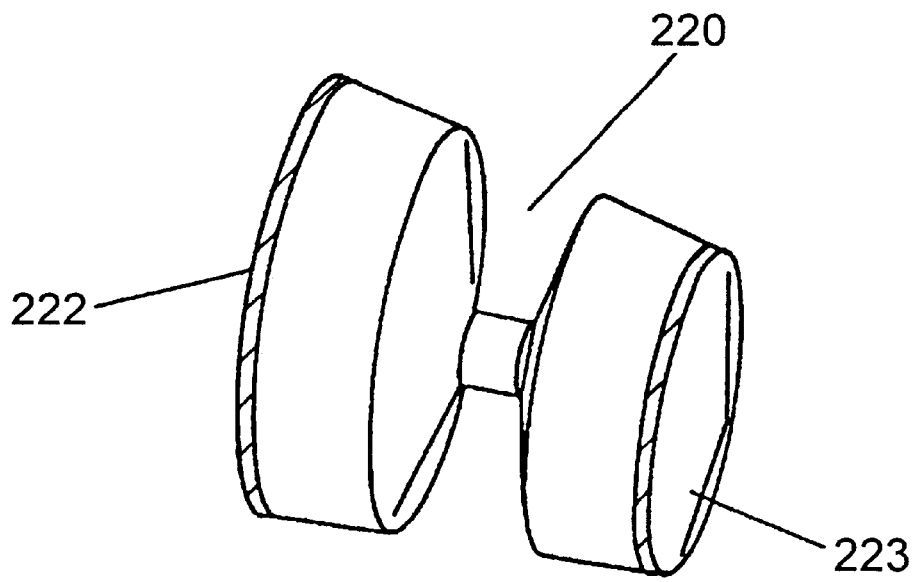
FIG. 8 is a perspective view showing still another roller of the rotary connector in the same.
Figure 9:
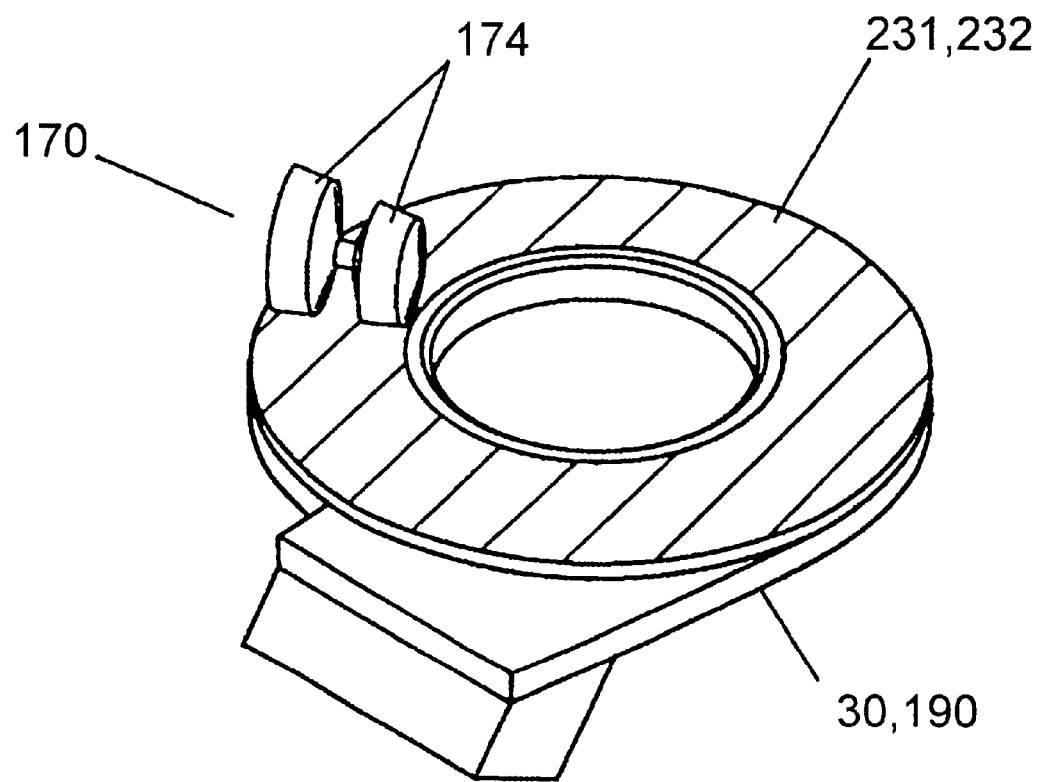
FIG. 9 is a perspective view showing a lower-side-cover and the still another roller of the rotary connector in the same.

FIG. 4 is a cross sectional plan view showing a rotary connector in the second exemplary embodiment of the present invention, FIG. 5 is a cross sectional side view showing the main portion of the rotary connector in the same, FIG. 6 is a perspective view showing a roller of the rotary connector in the same, FIG. 7 is a perspective view showing another roller of the rotary connector in the same, FIG. 8 is a perspective view showing still another roller of the rotary connector in the same, FIG. 9 is a perspective view showing a lower-side-cover and the still another roller of the rotary connector in the same.

As shown in FIG. 4 and FIG. 5, as in the first exemplary embodiment, the annular space 40 is formed with the inner wall 11 of the annular outer case 10 and the outer wall of the cylindrical portion 22 of the inner case 20 which is rotatably disposed at the inner side of the outer case 10, and, the flat cable 50 is disposed in the annular space 40 in such a manner as to be wound in a first direction and in a second direction which is opposite to the first direction via the U-shaped reversed-portion 53, also the guide ring 160 is disposed in the annular space 40 in the state that the plurality of hinge-shaped elastic portions 161 which are unitarily formed with the guide ring 160 on the upper side thereof elastically contact with the lower side of the cover portion 21 of the inner case 20.

Also, as in the first exemplary embodiment, the constricted intermediate supporting portion 181 of each of a plurality of cylindrical rollers 180 is rotatably supported by the guide ring 160 in the state that the rotation axis of each roller 180 slants.

The difference from the first exemplary embodiment is that, in this exemplary embodiment, on each of the rollers 180, roller supporting portions 184 are formed between the intermediate supporting portion 181 and the outer end portion (i.e., the portion positioned at the side of the inner wall 11 of the outer case 10) 182 thereof, and, between the intermediate supporting portion 181 and the inner end portion (i.e., the portion positioned at the side of the outer wall of the cylindrical portion 22 of the inner case 20) 183 thereof. The diameters of the supporting portions 184 are smaller than the respective diameters of the outer end portion 182 and the inner end portion 183, but larger than the diameter of the intermediate supporting portion 181. The roller supporting portions 184 of each roller 180 are elastically contacted with annular-protuberances 191 formed on the upper side of a lower-side-cover 190 by the elastic pressing force of the elastic portions 161.

In the above structure, when the inner case 20 is counterclockwise or clockwise rotated, the guide ring 160, whose elastic portions 161 contact with the lower side of the cover portion 21 of the inner case 20, rotates along the rotating direction of the inner case 20, and, as in the first exemplary embodiment, the winding of the cable 50 is performed by the lower half portion of the conical outer end-side and by the upper half portion of the conical inner end-side of each roller 180 since the respective portions of the end-sides contact with the cable 50, and, the cable 50 becomes the state of wound-up or wound-off. In this case, different from the first exemplary embodiment, the winding of the cable 50 is performed by the end-sides of the end portions (182,183) whose diameters are larger than the diameters of the roller supporting portions 184 which elastically contact with the annular-protuberances 191 formed on the upper side of the lower-side-cover 190.

As described in the above, in this exemplary embodiment, in each roller, the diameters of both end portions (182,183)

whose end-sides contact with the cable 50 are formed to be larger than the diameters of the roller supporting portions 184. Therefore, even when difference occurs between the rolled-dimension of each roller 180 and the dimension of the cable 50 wound by each roller 180 depending on the size of the rotary connector, the winding of the cable 50 can be smoothly performed by properly adjusting the respective ratios of the diameters of the end portions (182,183) to the diameters of the roller supporting portions 184, on each roller 180.

In the above description, the end-sides of each roller (170,180), which contact with flat cable 50, are respectively shaped into substantially circular cones. In this case, by forming flat portions on the substantially central portions of the respective conical end-sides (202,203) as shown in FIG. 6, the contact areas between the respective end-sides (202, 203) and the cable 50 can be properly adjusted for decreasing the difference between the rolled-dimensions of the respective end portions of each roller 200 and the dimensions of the cable 50 wound by the respective end-sides (202,203) of the roller 200, whereby the rotation of the guide ring 160 and the winding of the cable 50 can be performed smoothly.

Furthermore, as shown in FIG. 7, the end-sides (212,213) of each roller 210 can be formed to be rugged by forming a plurality of dots on the end-sides (212,213) which are respectively shaped into substantially circular cones, whereby the cable 50 is contacted with the rugged (i.e., multiple-point-contact) end-sides (212,213), and, by properly adjusting the ruggedness (i.e., friction) of the end-sides (212,213), the winding of the cable 50 can be surely performed by the roller 210 even when the rotation of the guide ring 160 or the roll of the roller 210 becomes irregular.

Also, as shown in FIG. 8, by applying or by sticking elastic material or highly viscous material such as rubber, elastomer or the like on the respective end-sides (222,223) of each roller 220, the friction between the cable 50 and the end-sides (222,223) can be increased, whereby the winding of the cable 50 can be surely performed even in high speed by suppressing the occurrence of slippage between the end-sides (222,223) and the cable 50.

Also, as shown in FIG. 9, by applying or sticking elastic material 231 or highly viscous material 232 such as rubber, elastomer or the like on the upper side of the lower-side-cover (30,190), the friction between the circumference-side 174 of each roller 170 and the upper side of the lower-side-cover (30,190) can be increased, whereby each roller 170 can be surely rotated even when the inner case 20 is rotated with high speed. As a result, the winding of the cable 50 can be surely performed.

Also, by applying or sticking the elastic material or the highly viscous material on the circumference-side 174 of each roller 170 instead of the upper side of the lower-side-cover (30,190), the same effect can be obtained.

Third Exemplary Embodiment

Figure 10:
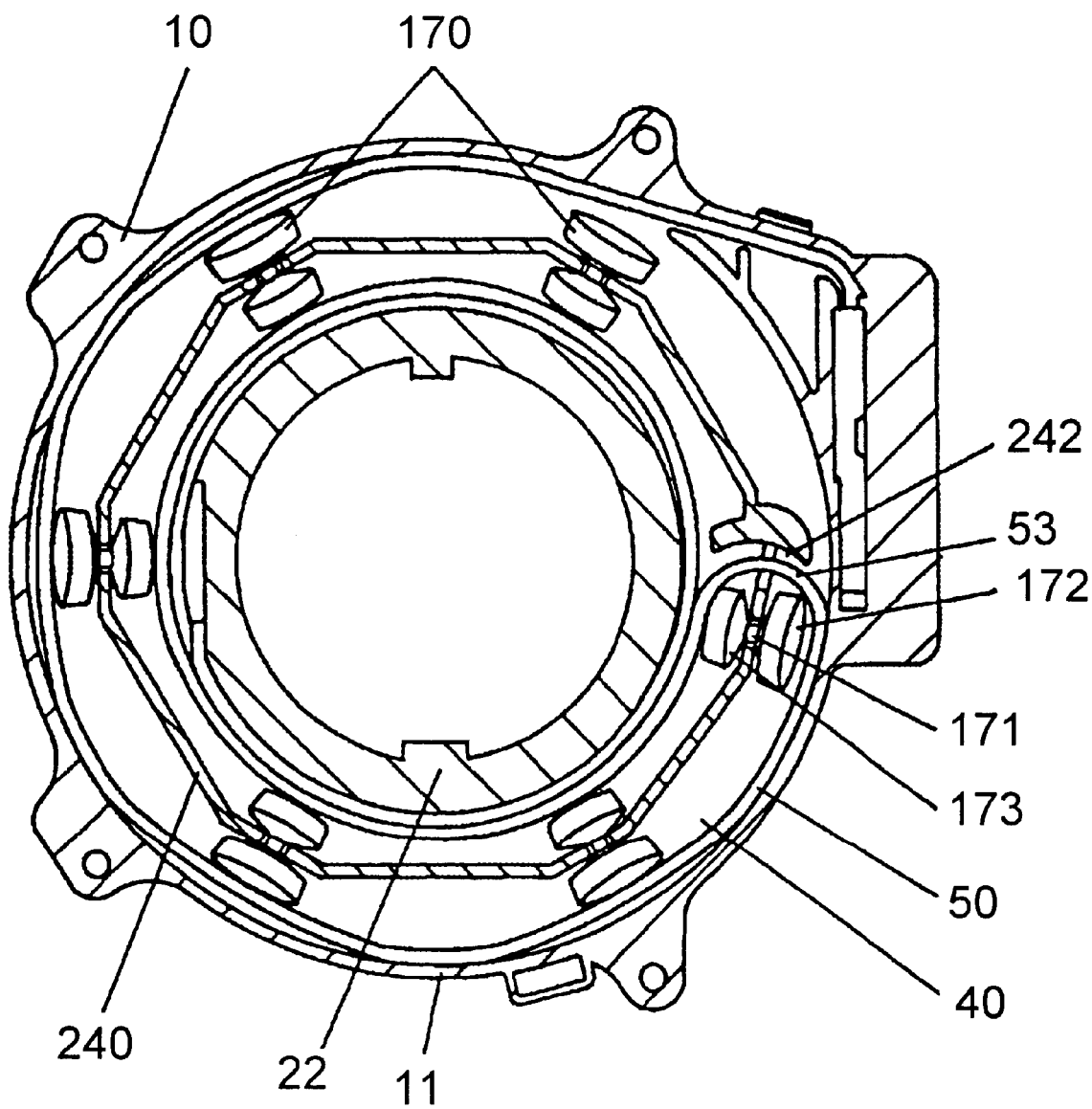
FIG. 10 is a cross sectional plan view showing a rotary connector in a third exemplary embodiment of the present invention.
Figure 11:
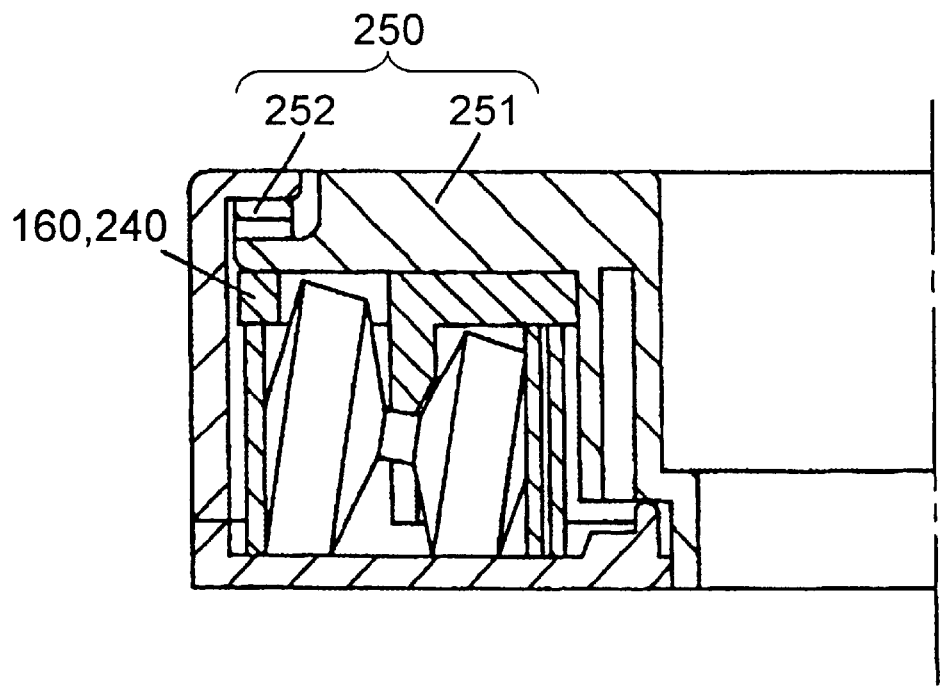
FIG. 11 is a cross sectional side view showing another elastic portion and another elastically contacting structure of the rotary connector in the same.
Figure 12:
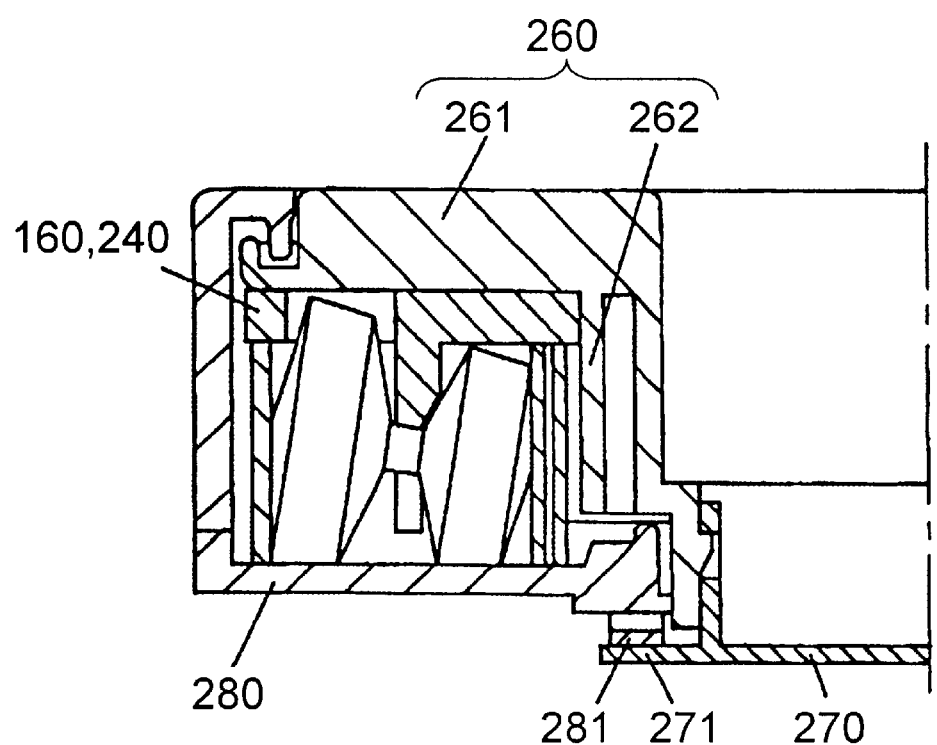
FIG. 12 is a cross sectional side view showing still another elastic portion and still another elastically contacting structure of the rotary connector in the same.
Figure 13:
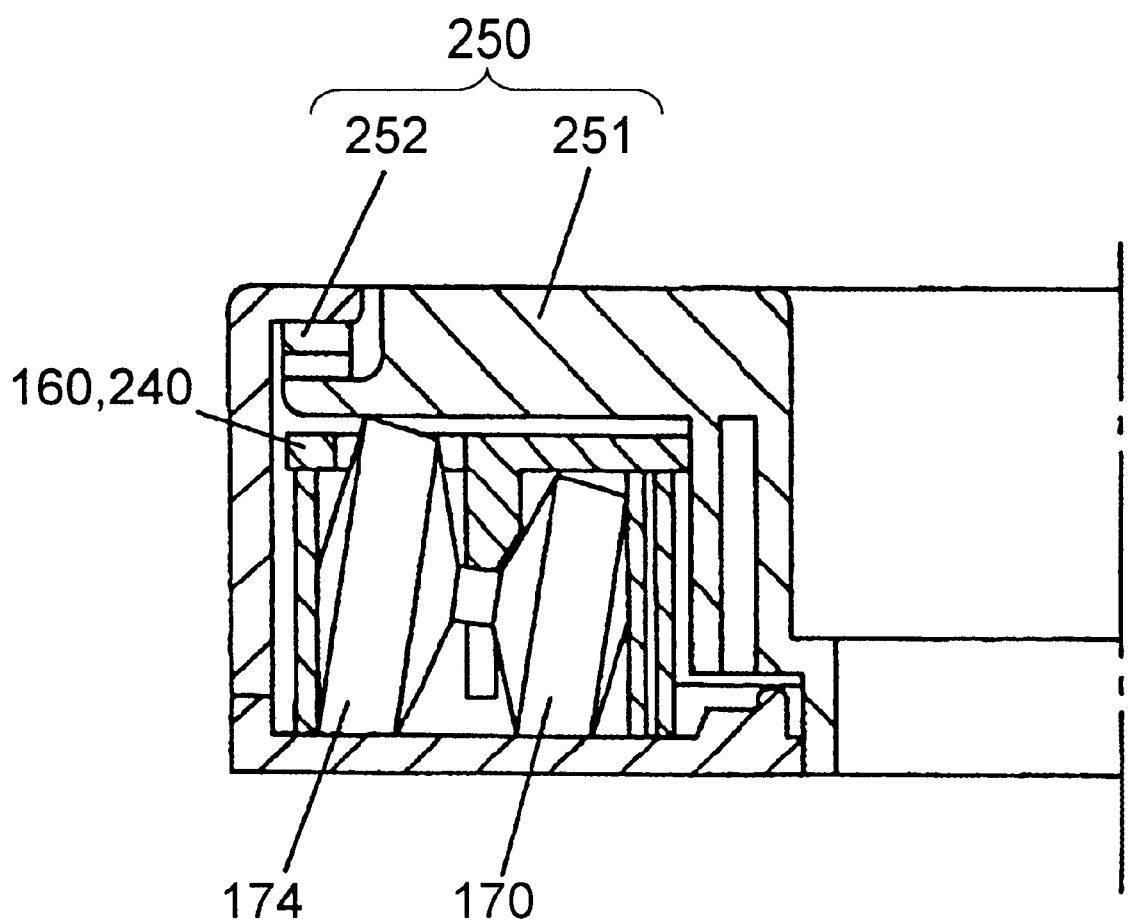
FIG. 13 is a cross sectional side view showing further still another elastically contacting structure of the rotary connector in the same.
Figure 14:
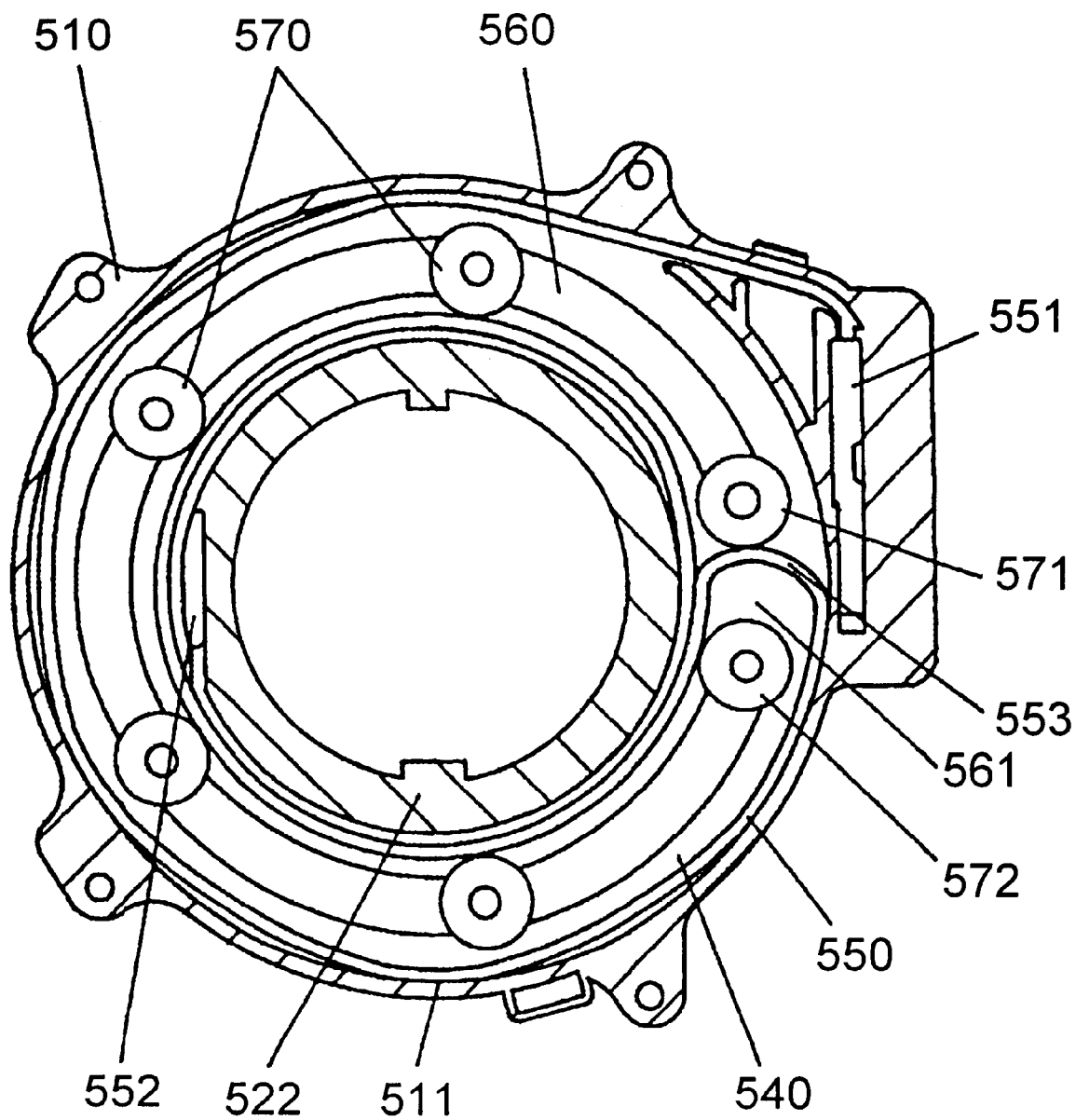
FIG. 14 is a cross sectional plan view showing a conventional rotary connector.
Figure 15:
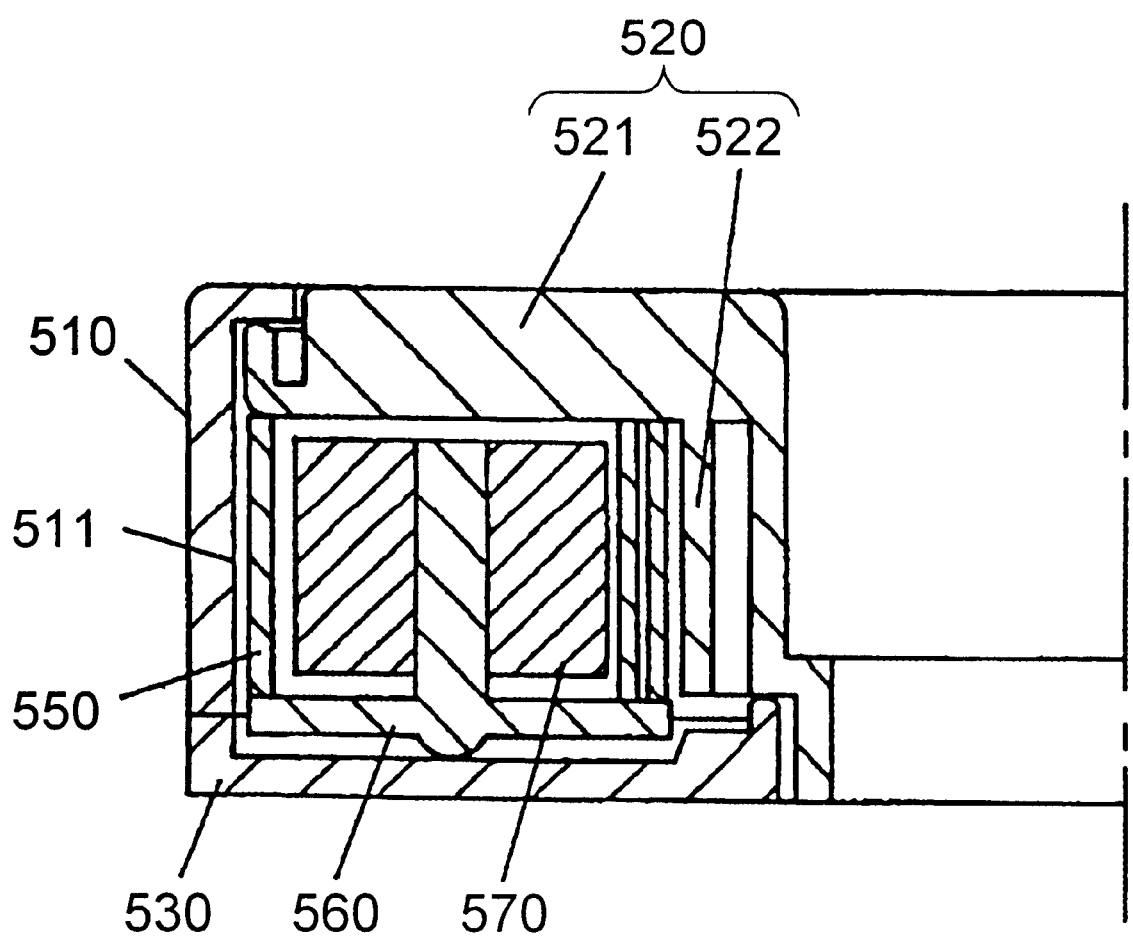
FIG. 15 is a cross sectional side view showing the main portion of the same.
Figure 16:
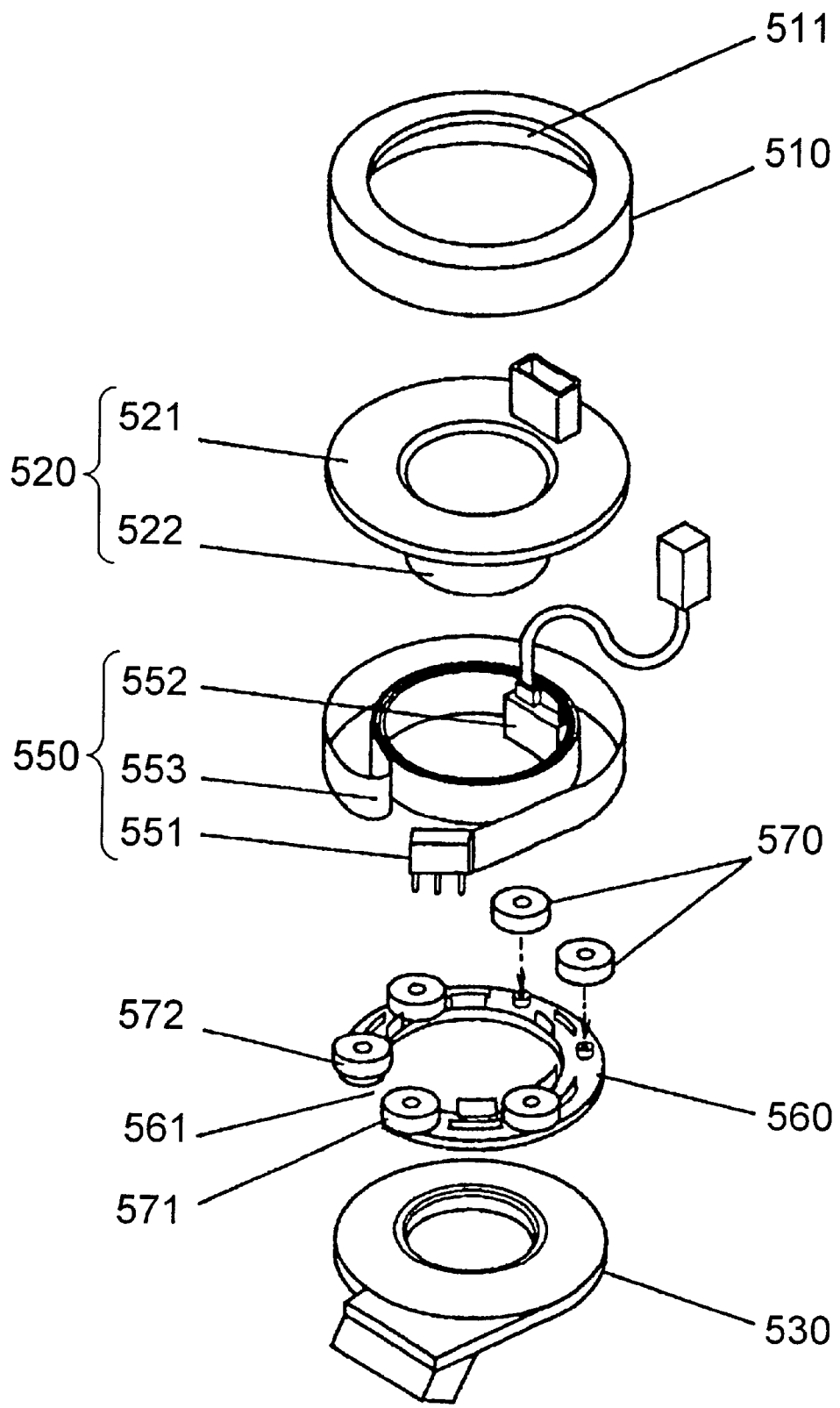
FIG. 16 is an exploded view showing the conventional rotary connector.

FIG. 10 is a cross sectional plan view showing a rotary connector in the third exemplary embodiment of the present invention, FIG. 11 is a cross sectional side view showing another elastic portion and another elastically contacting structure of the rotary connector in the same, FIG. 12 is a cross sectional side view showing still another elastic portion and still another elastically contacting structure of the rotary connector in the same, FIG. 13 is a cross sectional side view showing further still another elastically contacting structure of the rotary connector in the same.

As shown in FIG. 10, as in the first exemplary embodiment, the annular space 40 is formed with the inner wall 11 of the annular outer case 10 and the outer wall of the cylindrical portion 22 of the inner case 20, and, in the annular space 40, the flat cable 50 is disposed in such a manner as to be wound in a first direction and in a second direction which is opposite to the first direction via the U-shaped reversed portion 53 of the cable 50, also a guide ring 240 is disposed, also the intermediate supporting portion 171 of each of the plurality of cylindrical rollers 170 is rotatably supported by the guide ring 240 in the state that the rotation axis of each roller 170 slants.

The difference from the first exemplary embodiment is that, in this exemplary embodiment, one of the rollers 170 is disposed near to the cut-portion 242 of the guide ring 240, where the reversed portion 53 of the flat cable 50 passes through.

The lower half portion of the outer end-side 172 of the roller 170 disposed near to the cut-portion 242 and the upper half portion of the inner end-side 173 of the same roller 170 respectively contact with the inner side of the substantially U-shaped reversed portion 53 of the cable 50.

In the above structure, when the inner case 20 is counterclockwise or clockwise rotated, the guide ring 240 rotates along the rotating direction of the inner case 20, and each roller 170 is rolled accordingly, whereby, as in the first exemplary embodiment, the winding of the cable 50 is performed by the substantially conical outer end-side 172 whose lower half portion contacts with the cable 50 and by the substantially conical inner end-side 173 whose upper half portion contacts with the cable 50, thus the cable 50 becomes the state of wound-up or wound-off. In this case, in the third exemplary embodiment, the roller 170 disposed at the inner side of the substantially U-shaped reversed-portion 53 also performs the winding of the cable 50, whereby the cable 50 is smoothly wound up or wound off. That is, in this exemplary embodiment, the winding of the cable 50 at the U-shaped reversed-portion 53 is performed smoothly by the roller 170 disposed at the inner side of the substantially U-shaped reversed-portion 53.

In the above description, the elastic portions are unitarily formed with the guide ring (160, 240 in FIGS. 1, 4, 10) on the upper side thereof, and the elastic portions contact with the lower side of the cover portion 21 of the inner case 20 for rotating guide ring (160,240) along the rotating direction of the inner case 20. However, the same effect can be obtained by forming elastic portions as shown in FIG. 11 and FIG. 12, which are described hereinafter.

In FIG. 11, elastic portions 252 are unitarily formed with an inner case 250 on the upper side of the cover portion 251 thereof, whereby the lower side of the cover portion 251 is elastically contacted with the upper side of the guide ring (160,240) by the pressing force of the elastic portions 252.

In FIG. 12, elastic portions 281 are unitarily formed with a lower-side-cover 280 on the lower side thereof, and the elastic portions 281 are elastically contacted with the upper side of the brim portion 271 of a supporting member 270 which is fixed to the lower side of the cylindrical portion 262 of an inner case 260 which has a cover portion 261, whereby the lower side of the cover portion 261 of the inner case 260 is elastically contacted with the upper side of the guide ring (160,240).

The structures shown in FIG. 11 and FIG. 12 also realizes a rotary connector in which a noise caused by the each-other's bumps of the component parts is suppressed and the cost is decreased.

In the above description, the circumference-side of each roller is elastically contacted with the upper side of the lower-side-cover by pressing the guide ring (160,240) downward with elastic portions which are unitarily formed with the guide ring (160,240), or with the inner case 260 or with the lower-side-cover 280. In such structure, separate elastic members for suppressing the bumping noise are not needed, whereby the cost of the rotary connector is decreased. On the other hand, even when the separate elastic members are used instead of the unitarily formed elastic portions, the same effect can be obtained depending on the structure of the rotary connector or the shapes of the component parts of the rotary connector.

In FIG. 13, the circumference-side 174 of each roller 170 contacts with both lower side of the cover portion 251 of the inner case 250 and the upper side of the lower-side-cover, and, the lower side of the cover portion 251 of the inner case 250 is elastically contacted with the upper side of the guide ring (160,240) by the pressing force of the elastic portions 252 which are unitarily formed with the inner case 250 on the upper side of the cover portion 251 thereof. In this structure, the rollers 170 are directly rolled by the rotation of the inner case 250, whereby the winding of the flat cable 50 is more surely performed.

As described in the above, the present invention realizes a reliable low cost rotary connector in which a noise caused by the each-other's bumps of the component parts of the rotary connector is suppressed and the stress applied to the flat cable is greatly decreased.

What is claimed is:

1. A rotary connector comprising:
   (a) an annular outer case;
   (b) an inner case disposed at the inner side of said annular outer case in such a manner as to be rotatable relatively to said annular outer case, wherein said inner case comprises a cylindrical portion and a cover portion which covers the upper side of an annular space formed with said annular outer case and said cylindrical portion of said inner case;
   (c) a lower-side-cover for covering the lower side of said annular space, wherein said lower-side-cover is fixed to said annular outer case;
   (d) a flexible flat cable disposed in said annular space in such a manner as to be wound along the inner wall of said outer case in a first direction and along the outer wall of said cylindrical portion of said inner case in a second direction which is opposite to said first direction via the reversed portion of said flat cable, wherein both ends of said flat cable are respectively electrically connected to outer members;
   (e) a guide ring having a cut-portion where said reversed portion of said flat cable passes through, wherein said guide ring is disposed in said annular space in such a manner as to be rotatable in the state that said guide ring elastically contacts with the lower side of said cover portion of said inner case;
   (f) a plurality of cylindrical rollers, wherein the intermediate supporting portion of each of said rollers is rotatably supported by said guide ring in the state that the rotation axis of said roller slants, and the lower portion of the outer end-side and the upper portion of the inner end-side of each of said rollers respectively contact with said flat cable, also the circumference-side of each of said rollers elastically contacts with the upper side of said lower-side-cover.

2. The rotary connector according to claim 1, wherein each of said rollers is formed in such a manner that the diameter of the portion whose circumference-side elastically contacts with the upper side of said lower-side-cover is larger than the diameter of said intermediate supporting portion.

3. The rotary connector according to claim 1, wherein each of said rollers is formed in such a manner that the diameter of the outer portion thereof is larger than the diameter of the inner portion thereof.

4. The rotary connector according to claim 2, wherein each of said rollers is formed in such a manner that the diameter of the outer portion thereof is larger than the diameter of the inner portion thereof.

5. The rotary connector according to claim 1, wherein a supporting portion is formed on each of said rollers, and the diameter of said supporting portion is smaller than the diameters of the respective end portions of said roller, also the circumference-side of said supporting portion elastically contacts with the upper side of said lower-side-cover.

6. The rotary connector according to claim 1, wherein at least one of the end-sides of each of said rollers is shaped into one of a substantially circular cone and a substantially spherical cone.

7. The rotary connector according to claim 6, wherein a flat portion is formed on substantially central portion of at least one of the end-sides of each of said rollers.

8. The rotary connector according to claim 1, wherein at least one of the end-sides of each of said rollers is formed to be rugged by forming a plurality of dots on said end-side.

9. The rotary connector according to claim 1, wherein one of elastic material and highly viscous material is applied or stuck on at least one of the end-sides of each of said rollers.

10. The rotary connector according to claim 1, wherein one of elastic material and highly viscous material is applied or stuck on at least one of the upper side of the lower-side-cover and the circumference-side of each of said rollers.

11. The rotary connector according to claim 1, wherein one of said rollers is disposed near to a cut-portion of said guide ring, and both end-sides of said roller contacts with the inner side of said reversed-portion of said flat cable.

12. The rotary connector according to claim 1, wherein an elastic portion is formed on one of said outer case, said inner case, said guide ring, and said lower-side-cover.

13. The rotary connector according to claim 1, wherein the circumference-side of each of said rollers contacts with the lower side of said cover portion of said inner case as well.

* * * * *